United States Patent
Wilhelmsson et al.

(10) Patent No.: US 11,542,846 B2
(45) Date of Patent: Jan. 3, 2023

(54) UREA INJECTION CONTROL SYSTEM FOR AN INTERNAL COMBUSTION ENGINE

(71) Applicant: VOLVO TRUCK CORPORATION, Gothenburg (SE)

(72) Inventors: Martin Wilhelmsson, Gothenburg (SE); Oscar Stjernberg, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/455,573

(22) Filed: Nov. 18, 2021

(65) Prior Publication Data

US 2022/0170401 A1 Jun. 2, 2022

(30) Foreign Application Priority Data

Dec. 2, 2020 (EP) ..................................... 20211274

(51) Int. Cl.
*F01N 3/20* (2006.01)
*B01D 53/94* (2006.01)

(52) U.S. Cl.
CPC ......... *F01N 3/208* (2013.01); *B01D 53/9418* (2013.01); *B01D 53/9431* (2013.01); *B01D 53/9495* (2013.01); *B01D 2255/50* (2013.01); *F01N 2610/02* (2013.01); *F01N 2900/08* (2013.01); *F01N 2900/1402* (2013.01); *F01N 2900/1404* (2013.01); *F01N 2900/1812* (2013.01)

(58) Field of Classification Search
CPC combination set(s) only.
See application file for complete search history.

(56) References Cited

U.S. PATENT DOCUMENTS

| | | | |
|---|---|---|---|
| 8,191,357 B2 | 6/2012 | Döring et al. | |
| 8,980,181 B2* | 3/2015 | Qi | F01N 3/208 422/111 |
| 9,631,538 B2* | 4/2017 | Gady | F01N 3/208 |
| 9,644,521 B2 | 5/2017 | Hegemann et al. | |
| 10,690,033 B1* | 6/2020 | Johnson | F01N 3/035 |
| 2009/0301066 A1 | 12/2009 | Sindano et al. | |
| 2012/0006010 A1* | 1/2012 | Kaemingk | F01N 9/00 60/286 |
| 2016/0201535 A1 | 7/2016 | Pokharel et al. | |
| 2017/0089244 A1* | 3/2017 | Josh | F01N 13/0093 |

(Continued)

FOREIGN PATENT DOCUMENTS

| | | |
|---|---|---|
| DE | 102013006153 A1 | 10/2014 |
| DE | 102015212700 A1 | 1/2017 |
| EP | 2226480 A1 | 9/2010 |

OTHER PUBLICATIONS

European Search Report dated Mar. 3, 2021 in corresponding European Patent Application No. 20211274.4, 9 pages.

*Primary Examiner* — Binh Q Tran
(74) *Attorney, Agent, or Firm* — Venable LLP; Jeffri A. Kaminski

(57) ABSTRACT

An urea injection control system for an internal combustion engine, specifically adapted to apply a scheme for decreasing a NOx level downstream of a selective catalytic reduction catalyst of an ICE related exhaust gas aftertreatment system. The present disclosure also relates to a corresponding computer implemented method and a computer program product.

16 Claims, 4 Drawing Sheets

(56) References Cited

U.S. PATENT DOCUMENTS

| | | |
|---|---|---|
| 2018/0008932 A1 | 1/2018 | Quigley et al. |
| 2018/0202339 A1* | 7/2018 | Niemeyer et al. |
| 2019/0178132 A1* | 6/2019 | Sundararajan .......... F01N 3/208 |
| 2019/0316503 A1* | 10/2019 | Shead ..................... F01N 3/035 |
| 2020/0063625 A1 | 2/2020 | Adelman et al. |

* cited by examiner

UREA INJECTION CONTROL SYSTEM FOR AN INTERNAL COMBUSTION ENGINE

TECHNICAL FIELD

The present disclosure generally relates to a urea injection control system for an internal combustion engine (ICE), specifically adapted to apply a scheme for decreasing a NOx level downstream of a selective catalytic reduction (SCR) catalyst of an ICE related exhaust gas aftertreatment system (EATS). The present disclosure also relates to a corresponding computer implemented method and a computer program product.

BACKGROUND

There is an ongoing development for reducing emissions in a vehicle, such as a truck, comprising a diesel-based combustion engine. A diesel engine has an efficiency of up to about 52% and is thus the best converter of fossil energy. The high efficiency is however only possible at an elevated combustion temperature at which high levels of oxides of nitrogen (NOx) are inevitable. The NOx emission concentration is in turn is dependent on local oxygen atom concentration and the local temperature.

Furthermore, a suppression of NOx formation by internal means (air/fuel ratio) has the tendency to cause an increase in particulates, known as the NOx-particulates trade off. Furthermore, an excess of oxygen in the exhaust gas from a diesel engine prevents the use of stoichiometric 3-way-catalyst technology for reduction of NOx as is used in gasoline engine cars from the late 80-ties. Accordingly, reducing (NOx) and particulate matter (PM) in exhaust gases from a diesel engine has become a very important problem in view of the protection of environment and the saving of finite fossil energy supply.

Current legal emission requirements generally dictate emission control, whereby exhaust gas aftertreatment systems (EATS) are necessary. Usually, such an EATS comprises a Selective Catalytic Reduction (SCR) for oxidizing nitrogen monoxide (NO) to nitrogen dioxide (NO2), a particulate filter and a unit for reducing NOx emissions. The EATS functions as soon as exhaust gas temperatures are around 200°-250° deg. C. However, ensuring that the EATS functions in an optimal manner is complicated and it is problematic to ensure that only a minimal level NOx is released into the environment.

A proposed solution to this problem is presented in US2016201535, specifically suggesting the introduction of adaptive calibration of the SCR. The adaptive calibration performed on the SCR device includes a comparison of a NOx conversion desired from the SCR device with an actual NOx conversion of the SCR device measured from inputs from a NOx sensor disposed upstream of the SCR device and a NOx sensor disposed downstream of the SCR device, for the given operating condition of the engine.

Even though US2016201535 improves the overall operation of the vehicle's aftertreatment device, there appears to be room for further improvements, specifically taking into account what type of means to apply for ensuring efficient operation of the vehicle.

SUMMARY

In accordance to an aspect of the present disclosure, the above is at least partly alleviated by means of a urea injection control system for an internal combustion engine (ICE), the ICE arranged in relation to an exhaust gas aftertreatment system (EATS), the urea injection control system comprising a urea injector adapted to inject urea into an exhaust line of the ICE, the exhaust line arranged in fluid communication with a selective catalytic reduction (SCR) catalyst of the EATS, and a control unit, wherein the control unit is adapted to select a first flow rate of urea injection based on a present operational condition of the ICE, determine a present operational region of a plurality of predefined operational regions for the ICE, select an adaptation factor for the present operational region, form a second flow rate of urea injection based on the first flow rate of urea injection and the selected adaptation factor, control the urea injector according to the second flow rate of urea injection, receive an indication of a NOx level downstream of the SCR catalyst, and adjust the adaptation factor for the present operational region to decrease the NOx level downstream of the SCR catalyst.

Advantages following by means of the present disclosure include the possibility to continuously adapt the operation of the EATS by ensuring that a flow rate of injected urea is kept at an optimal level, thereby ensuring that reduced amount of NOx is released into the environment. This is by means of the present disclosure solved by the understanding that the EATS is continuously affected by changing conditions, for example but not limited to an ambient environment, aging and/or deviation of components comprised within the EATS, etc.

To take into account a changing condition for the EATS, the control scheme according to the present disclosure makes use of an adaptation factor, where the adaptation factor function to adjust the flow rate of urea that is to be injected into the exhaust line of the ICE, for each of a plurality of different operational conditions of the ICE. However, since an ICE/EATS combination used in relation to one specific implementation can be seen as in some ways completely independent from another ICE/EATS combination used in relation to another implementation, it may generally not be possible to rely on in advance prepared adaptation factors. Rather, each ICE/EATS combination will need its own set of adaptation factors, where the adaptation factors will depend on how and where the ICE/EATS combination is used and operated. This is handled by the present disclosure by means of a further adjustment of the adaptation factors.

In accordance to the present disclosure, an adaptation factor is first selected by the control unit and then "tried" by the control unit to see how well it is functioning for the specific ICE/EATS combination (in dependence on the NOx level downstream of the SCR catalyst). The adaptation factor may then be slightly adjusted to see how the NOx level downstream of the SCR catalyst is changing for the present operational region. If the NOx level downstream of the SCR catalyst is decreasing, then the adjustment was "correct", and an adjusted adaptation factor has been created for the present operational region. The adjusted adaptation factor is preferably stored and later used when the ICE is again operating in that specific operational region. By means of the iterative scheme suggested by the inventors and implemented by the control unit it is thus possible to ensure that the only a minimal level of NOx is released into the environment, even when the EATS is subject to independently changing conditions.

To ensure that the continuous adaptation of the EATS is kept computational efficient it is in line with the present disclosure implemented a "stepwise" control within an overall operational range of the ICE, in accordance to the present disclosure defined by the plurality of predefined operational regions. The stepwise control can be compared with the application of a linear approach throughout the overall operational range of the ICE.

It should however be understood that the plurality of predefined operational regions in no way need to be evenly distributed throughout the overall operational range of the ICE, instead it may in an advantageous manner be possible to focus the computational power within the operational regions where the ICE is mostly active. This may for example be achieved by having an in comparison "higher resolution" within the operational regions where the ICE is mostly active.

Such an implementation may also in an advantageous manner simplify a general adaptation throughout the overall operational range of the ICE, meaning that the urea injection control system may make assumptions about the adaptation factor for operational regions where the ICE is not active that often (in comparison to the operational regions where the ICE is mostly active), for example by interpolating using adaptation factors for more often active operational regions for the ICE. Thus, it may in accordance to the present disclosure be possible to also adjust the adaptation factor within operational regions not currently being the present operational region (as has been defined above). Accordingly, the overall urea injection control system may be continuously adapted based on changes to e.g. component aging within the EATS, ICE, etc., with the overall purpose of ensuring that a minimal level NOx is released into the environment.

In line with the present disclosure, the control unit may in one embodiment be an electronic control unit (ECU), also used at least in part for controlling functions in relation to the ICE. However, at least one portion of the functionality of the control unit may in some alternative embodiments be performed using a remote server such as a cloud server, where the cloud server being network connected to an/the electronic control unit (ECU) provided in conjunction with the ICE. As such, it could be possible to allow sharing of the adjusted adaptation factors between different ICE/EATS combinations. Furthermore, it could be possible to "crowd source" adjusted adaptation factors for later manufactured/delivered ICE/EATS combinations. Sharing the adjusted adaptation factors may also improve a manufacturer's understanding of how different ICE/EATS combinations behaves over time.

In accordance with the present disclosure it may in some preferred embodiments be desirable to further adapt the control unit to determine the present operational region based on a combination of at least two intermediate operational parameters for the ICE. Making use of not only a single intermediate operational parameters for the ICE for determining "where" the ICE is active makes it possible to increase a reliability of the urea injection control system when selecting (and subsequently adjusting) the adaptation factor. Making use of at least two intermediate operational parameters for the ICE further strengthens the stepwise approach as discussed above, since a two-dimensional mapping of the adaptation factor may be taken and also used for again placing an increased focus on operational regions where the ICE is mostly active.

Preferably, the at least two intermediate operational parameters for the ICE are an exhaust temperature and an exhaust mass flow through the EATS. These two values are easily monitored, and it may be possible to receive a continuous stream of data from sensors used in conjunction with the monitoring process, making it possible to quickly change between adaptation factors as the ICE changes between different operational regions. The "exhaust temperature" may within the scope of the present disclosure be measured or estimated at different positions within the ICE/EATS combination, such as directly following the ICE, within/before/following the SCR catalyst, etc.

However, it should be understood that the present disclosure in no way is limited to just making use of the mentioned two intermediate operational parameters, or for that sake only two intermediate operational parameters, for the ICE for determining the present operational region. Rather, a multi-dimensional approach may be taken, where the exhaust temperature and the exhaust mass flow through the EATS may be combined with (or in some embodiments substituted with) for example intermediate operational parameters relating to revolutions per minute (RPM) for the ICE, a torque value for the ICE, an estimated NOx level generated by the ICE, a urea concentration, or an ambient humidity level in relation to the ICE. Additionally, in line with the present disclosure it may also be possible for the urea injection control system to take into account an ambient temperature at the ICE, when determining the present operational region for the ICE, since the ambient temperature at the ICE has shown to be providing a direct influence to how the EATS is operating.

The first flow rate of urea to be injected can however in an advantageous manner be determined in a simpler manner, not necessarily including two parameters. In one embodiment the present operational condition of the ICE may be determined by means of an indication of a NOx level upstream of the SCR catalyst. Such an indication may for example be based on a measurement from a first NOx sensor arranged upstream of the SCR catalyst. It should be understood that the indication of the NOx level upstream of the SCR catalyst in some embodiments as an alternative may be estimated from other parameters for operating the ICE, such as based on an intermediate value for the revolutions per minute (RPM) for the ICE.

The indication of the NOx level upstream of the SCR catalyst may in some embodiments be used also for adjusting the adaptation factor for the present operational region, with the purpose to increase a NOx conversion performance. The NOx conversion performance is in turn determined based on the indication of the NOx level upstream of the SCR catalyst and the indication of the NOx level downstream of the SCR catalyst, where it is desirable to work towards an adaptation factor for the present operational region that is adapted to maximize the NOx conversion performance. Generally, increasing the NOx conversion performance will result in a reduced level of NOx being released into the environment.

The indication of the NOx level downstream of the SCR catalyst may in a similar manner be determined from a second NOx sensor arranged downstream of the SCR catalyst for determining the indication of the NOx level downstream of the SCR catalyst. In some embodiments it may be desirable to select an operational range for the first NOx sensor that corresponds to an operational range for the second NOx sensor, reducing the cost associated with introducing different types of NOx sensors with the urea injection control system. The first and the second NOx sensor is preferably arranged in communication with the control unit.

Furthermore, the urea injection control system as presented above may in some embodiments be a component of a vehicle, further comprising the above-mentioned ICE/EATS combination. Such a vehicle may in turn for example be at least one of a truck, a buss, a car and a working machine. The urea injection control system is however also useful in other applications where the ICE/EATS combination is used for other purposes than propelling a vehicle. An example of such an implementation is an electric generator comprising an ICE/EATS combination. The ICE is in turn generally a diesel-powered engine. It should be understood that other applications are possible, such as in relation to any kind of vessel, including for example a marine vessel.

According to another aspect of the present disclosure, there is provided a computer implemented method for operating a urea injection control system for an internal combustion engine (ICE), the ICE being arranged in relation to an exhaust gas aftertreatment system (EATS), the urea injection control system comprising a urea injector adapted to inject urea into an exhaust line of the ICE, the exhaust line being arranged in fluid communication with a selective catalytic reduction (SCR) catalyst of the EATS, and a control unit (208), wherein the method comprises the steps of selecting, using the control unit, a first flow rate of urea injection based on a present operational condition of the ICE, determining, using the control unit, a present operational region of a plurality of predefined operational regions for the ICE, selecting, using the control unit, an adaptation factor for the present operational region, forming, using the control unit, a second flow rate of urea injection based on the first flow rate of urea injection and the selected adaptation factor, controlling, using the control unit, the urea injector according to the second flow rate of urea injection, receiving, at the control unit, an indication of a NOx level downstream of the SCR catalyst, and adjusting, using the control unit, the adaptation factor for the present operational region to decrease the NOx level downstream of the SCR catalyst. This aspect of the present disclosure provides similar advantages as discussed above in relation to the previous aspect of the present disclosure.

Further effects and features of the present computer implemented method are similar to what has been presented above in relation to the previous aspect of the present disclosure.

According to an additional aspect of the present disclosure, there is provided a computer program product comprising a non-transitory computer readable medium having stored thereon computer program means for operating a urea injection control system for an internal combustion engine (ICE), the ICE being arranged in relation to an exhaust gas aftertreatment system (EATS), the urea injection control system comprising a urea injector adapted to inject urea into an exhaust line of the ICE, the exhaust line arranged in fluid communication with a selective catalytic reduction (SCR) catalyst of the EATS, and a control unit, wherein the computer program product comprises code for selecting, using the control unit, a first flow rate of urea injection based on a present operational condition of the ICE, code for determining, using the control unit, a present operational region of a plurality of predefined operational regions for the ICE, code for selecting, using the control unit, an adaptation factor for the present operational region, code for forming, using the control unit, a second flow rate of urea injection based on the first flow rate of urea injection and the selected adaptation factor, code for controlling, using the control unit, the urea injector according to the second flow rate of urea injection, code for receiving, at the control unit, an indication of a NOx level downstream of the SCR catalyst, and code for adjusting, using the control unit, the adaptation factor for the present operational region to decrease the NOx level downstream of the SCR catalyst. Also this aspect of the present disclosure provides similar advantages as discussed above in relation to the previous aspects of the present disclosure.

A software executed by the server for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

Figure 1:
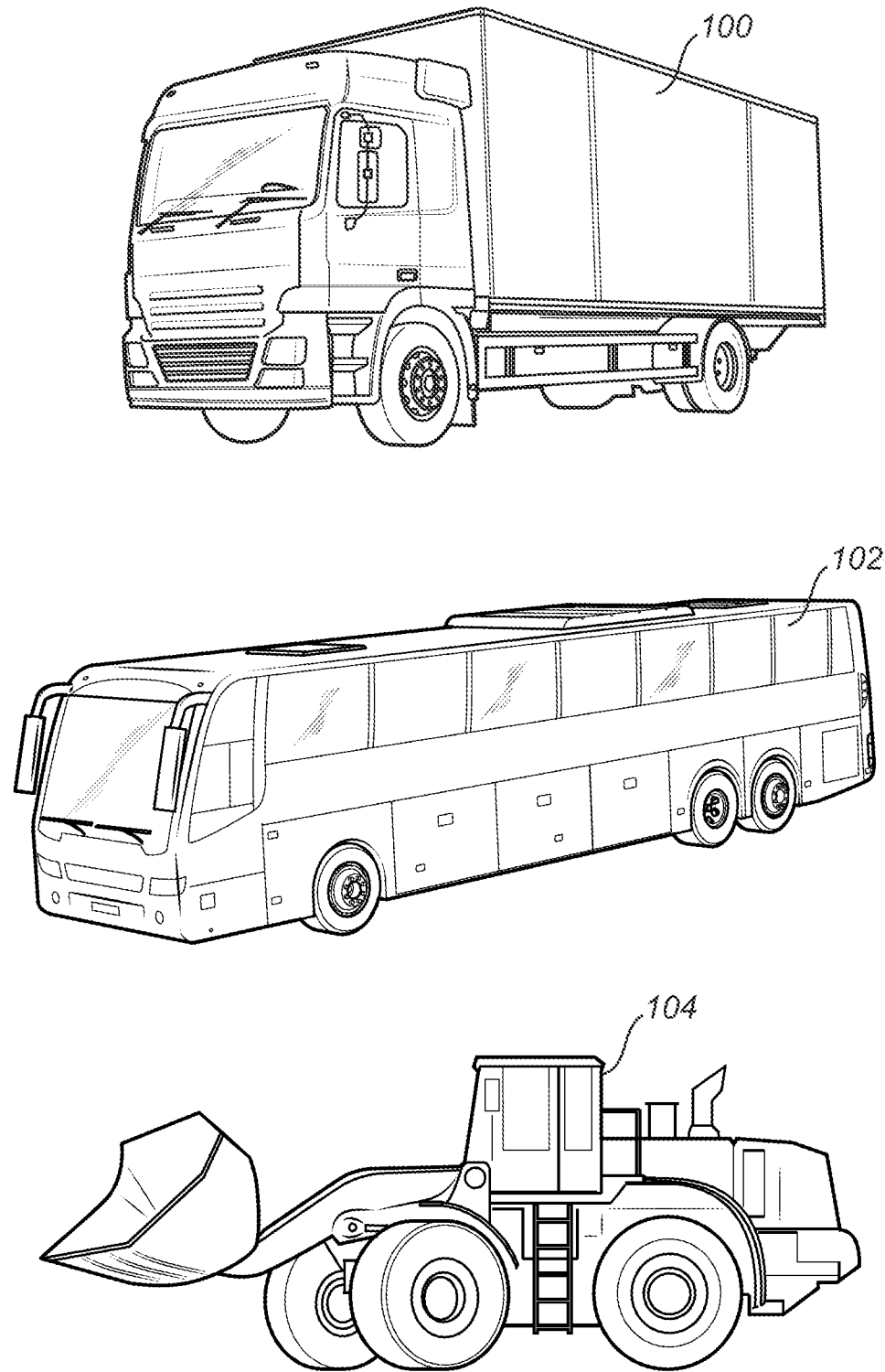
FIG. 1 illustrates a truck, a bus and a wheel loader in which the urea injection control system according to the present disclosure may be incorporated.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 2:
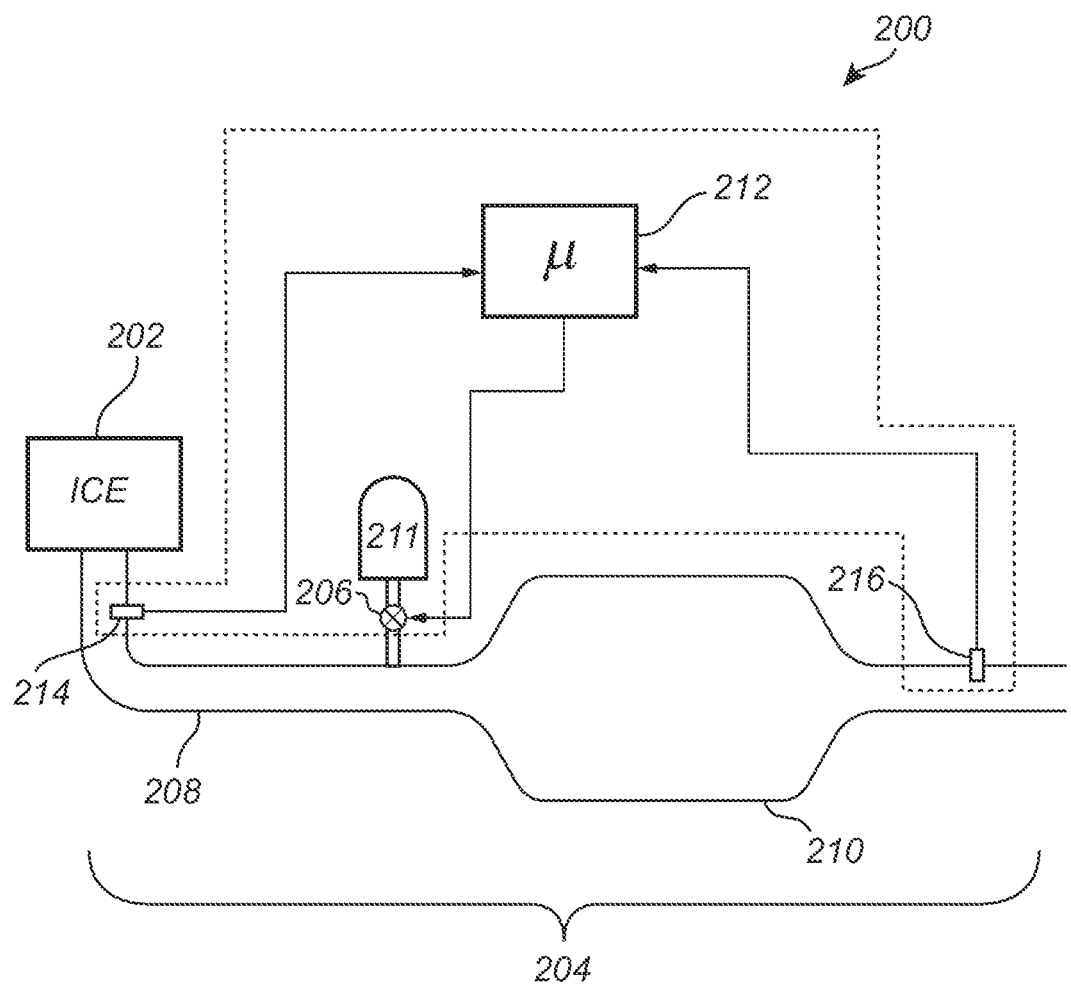
FIG. 2 conceptually illustrates a urea injection control system for an internal combustion engine (ICE) according to a currently preferred embodiment of the present disclosure, comprised as a component of propulsion means for e.g. the vehicles as shown in FIG. 1.

Referring now to the drawings and to FIG. 1 in particular, there is depicted an exemplary vehicle, here illustrated as a truck 100, in which a urea injection control system 200 (as shown in FIG. 2) according to the present disclosure may be incorporated. The urea injection control system 200 may of course be implemented, possibly in a slightly different way, in a bus 102, wheel loader 104, a car, an electric generator, etc.

The vehicle may for example be either a diesel vehicle or hybrid vehicle, the hybrid vehicle comprising both an electrical machine and a diesel engine. The vehicle may further be manually operated, fully or semi-autonomous. The urea injection control system 200 could however possibly be used in relation to other engine types using alternative fuels, i.e. not necessarily being based on the use of diesel fuel.

Turning now to FIG. 2, which conceptually illustrates a urea injection control system 200 according to a currently preferred embodiment of the present disclosure, for use in relation to an internal combustion engine (ICE) 202. The urea injection control system 200 may be defined as a component of an exhaust gas aftertreatment system (EATS) 204 arranged downstream of the ICE 202. The urea injection control system 200 could also be seen as a separate component provided in addition to the ICE/EATS combination.

The urea injection control system 200 is according to an embodiment of the present disclosure defined to comprise a urea injector 206 adapted to inject urea into an exhaust line 208 of the ICE 202, the exhaust line 208 being arranged in fluid communication with a selective catalytic reduction (SCR) catalyst 210 of the EATS 204. The SCR catalyst 210 may for example include a base metal/zeolite formulation with optimum NOx conversion performance in the range of 200-500° C.

The urea injection control system 200 further comprises a control unit 212 provided for controlling the urea injector 206. The ICE 202 is generally arranged in communicating with an air intake manifold (not shown) and the exhaust line 208. The further components of the ICE 202 are excluded in FIG. 2.

Reductant, such as aqueous urea, is stored in a storage vessel 211 and delivered upstream of the SCR catalyst 210 using the to the exhaust line 208 using the urea injector 206. The reductant is metered out by a pump through a control valve of the urea injector 206, where both the pump and the valve are controlled by the control unit 212. Air and reductant are then injected into the exhaust line 218 in a vaporized state, whereby the vapor is introduced into an exhaust gas mixture when entering the SCR catalyst 210.

The urea injection control system 200 further comprises two separate NOx sensors, where a first NOx sensor 214 is arranged upstream, and a second NOx sensor 216 is arranged downstream of the SCR catalyst 210. Both the first and the second NOx sensor 214, 216 are coupled in the path of the exhaust gas from the ICE 202 entering and exiting the SCR catalyst 210, respectively. The outputs of these sensors 214, 216 are acquired by the control unit 212 and used by the control unit 212, for example for controlling the urea injector 206 as well as for determining a NOx conversion efficiency of the SCR catalyst 210.

The EATS 204 preferably also comprises a particulate filter (not shown) arranged downstream of the SCR catalyst 210 and used to trap particulate matter (such as soot) generated during operation of the ICE 202. The particulate filter can be manufactured from a variety of materials including cordierite, silicon carbide, and other high temperature oxide ceramics.

The EATS 202 may also preferably comprise an oxidation catalyst (not shown) arranged upstream of the SCR catalyst 210. The oxidation catalyst may for example be a precious metal catalyst, for example containing platinum, for rapid conversion of hydrocarbons (HC), carbon monoxide (CO) and nitrous oxide (NO) in the engine exhaust gas. The oxidation catalyst may also be used for, during normal operation of the vehicle 100, 102, 104, used to supply heat for fast warm up of the SCR catalyst 210, which is done by increasing the HC concentration in the exhaust gas entering the oxidation catalyst, where an exotherm is created when the extra HC is reduced over the oxidation catalyst.

The control unit 212 may for example be an electronic control unit (ECU), comprised with the vehicle 100, 102, 104, possibly manifested as a general-purpose processor, an application specific processor, a circuit containing processing components, a group of distributed processing components, a group of distributed computers configured for processing, a field programmable gate array (FPGA), etc. The control unit 212 may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Figure 3:
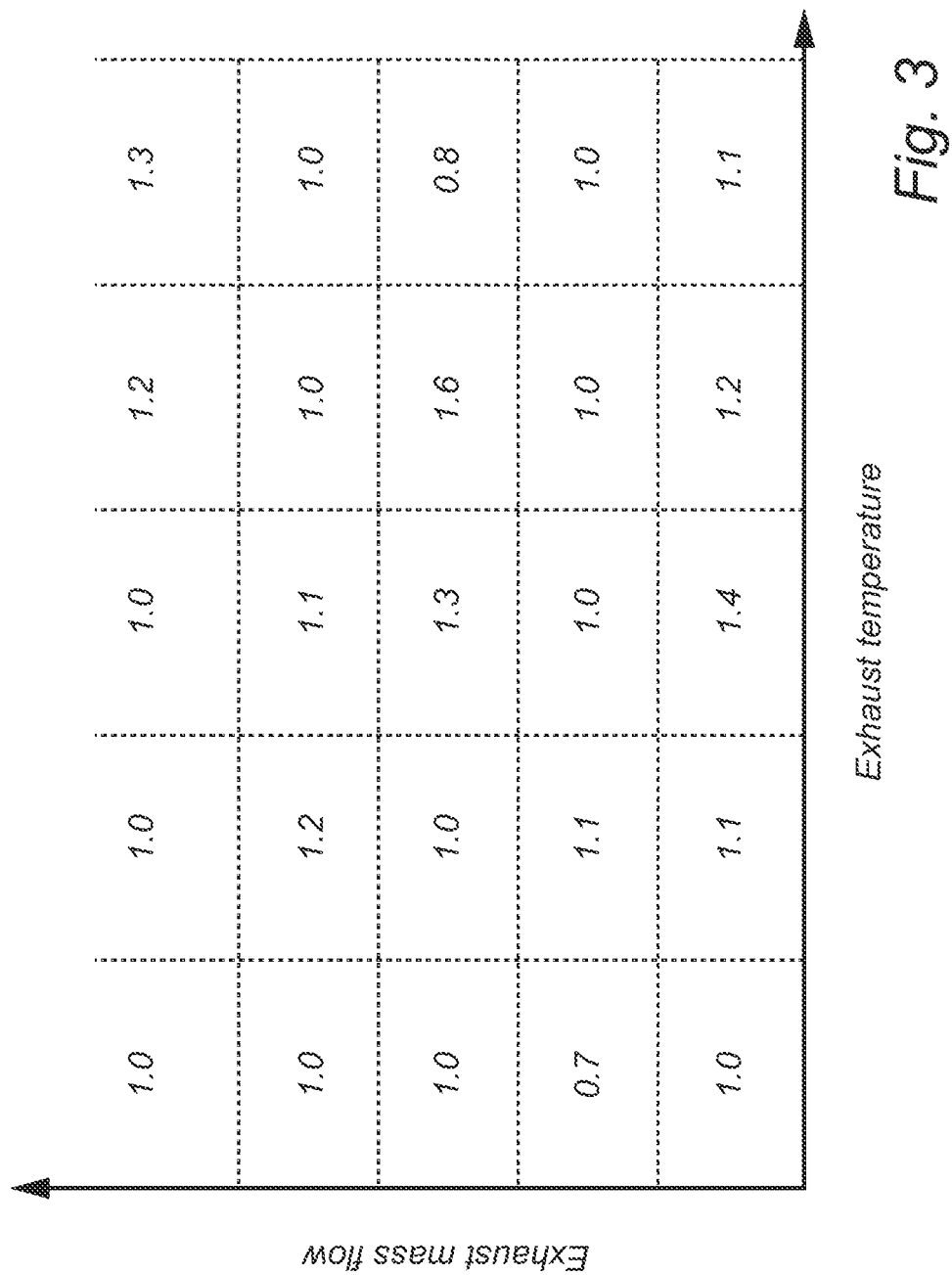
FIG. 3 provides an illustrative example of a plurality of predefined operational regions for the ICE.
Figure 4:
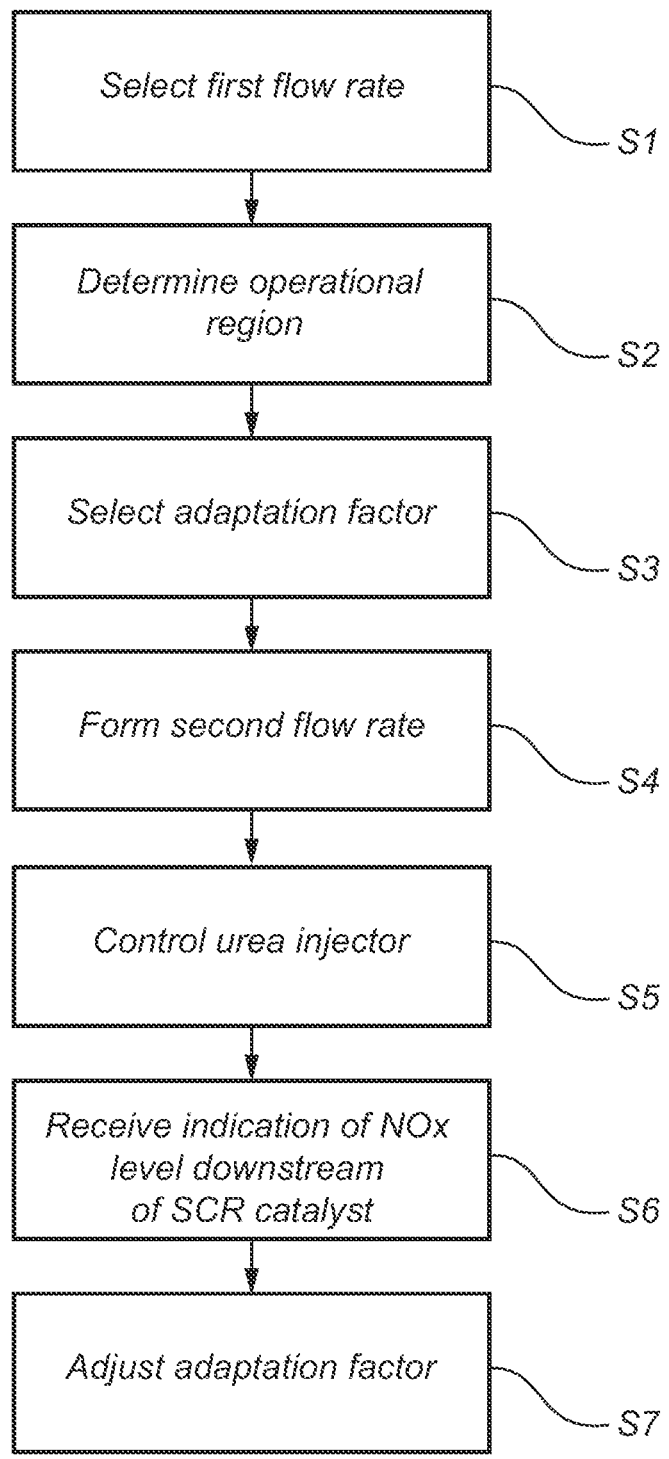
FIG. 4 shows a flow chart of a method according to an embodiment of the present disclosure.

During operation of the ICE 202, with further reference to FIGS. 3 and 4, the process may for example be initiated by receiving a measurement from the first NOx sensor 214, where the first NOx sensor 214 provides data representative of a level of NOx generated by the ICE 202. The control unit 212 in turn determines a present operational condition of the ICE 202 based on the level of NOx generated by the ICE 202 and selects, S1, a first flow rate of urea injection that it considers to be suitable to reduce the level of NOx that will be released into the environment. However, as has been explained above, the control unit further implements a control scheme for ensuring that the actual flow rate of urea injection also matches an actual status of the EATS 204 as well as the ambient environmental conditions.

This control is in line with the present disclosure achieved by determining, S2, a present operational region of a plurality of predefined operational regions for the ICE 202. As is illustrated in FIG. 3, the control unit 212 is exemplified to hold information about 25 different predefined operational regions. The predefined operational regions are in turn two-dimensionally mapped towards two different intermediate operational parameters for the ICE 202, in a five-by-five matrix. In FIG. 3, the two different intermediate operational parameters are exemplified as an exhaust temperature and an exhaust mass flow through the EATS 204, where the exhaust temperature is shown on the x axis and the exhaust mass flow is shown on the y axis. In FIG. 3 the adaptation factors are exemplified to range between 0.6 and 1.8. It should however be understood that differently selected adaptation factors are possible and within the scope of the present disclosure.

The control unit 212 will based on the determined present operational region select, S3, an adaptation factor and then use the selected adaptation factor for forming, S4, a second flow rate of urea injection. In an embodiment of the present disclosure the selected adaptation factor will be multiplied with the first flow rate. The control unit 212 will then proceed with controlling, S5, the urea injector 206 according to the second flow rate of urea injection.

The selected adaptation factor may however not necessarily be the most optimal adaptation factor to ensure that the least possible level NOx is released into the environment. To move towards such an optimum, the present control unit 212 further implements a step of receiving, S6, an indication of a NOx level downstream of the SCR catalyst 210, such as from the second NOx sensor 216. The indication of the NOx level downstream of the SCR catalyst 210 is then used by the control unit 212 to adjust, S7, the adaptation factor for the present operational region, with the purpose of decreasing the NOx level downstream of the SCR catalyst 210. Such a measure may for example be implemented in an iterative manner, meaning that the control unit 212 continuously adjusts the adaptation factor (for the present operational region) and then measure a response at the second NOx sensor 216. If the NOx level at the second NOx sensor 216 is decreased, then the adjustment of the adaptation factor was correct, and the adjusted adaptation factor may be stored for later use when the ICE 202 again is operating in the same operational region. Conversely, in case the NOx level at the second NOx sensor 216 is increased, then the adjustment of the adaptation factor was incorrect, and it is desirable to again adjust the adaptation factor. It may be possible to continuously perform the iteration as suggested above or limit the iteration to a predetermined number of iterations, such as two-ten iterations. Further iterations are of course possible and within the scope of the present disclosure.

From the above discussion it should be understood that it will be possible to allow each ICE/EATS combination to be delivered with a "generalized" matrix of adaptation factors for the plurality of predefined operational regions for the ICE 202. Such a generalized matrix could for example be presented with all of the adaptation factors set to 1.0. The control unit 212 will then over time adjust the adaptation factors to match the status of the specific ICE/EATS combination, where the matrix of adaptation factors over time may be greatly differing between different ICE/EATS combinations, for example dependent on different usage and operational environments.

In summary, the present disclosure relates to a urea injection control system for an internal combustion engine (ICE), the ICE being arranged in relation to an exhaust gas aftertreatment system (EATS), the urea injection control system comprising a urea injector adapted to inject urea into an exhaust line of the ICE, the exhaust line arranged in fluid communication with a selective catalytic reduction (SCR) catalyst of the EATS, and a control unit, wherein the control unit is adapted to select a first flow rate of urea injection based on a present operational condition of the ICE, determine a present operational region of a plurality of predefined operational regions for the ICE, select an adaptation factor for the present operational region, form a second flow rate of urea injection based on the first flow rate of urea injection and the selected adaptation factor, control the urea injector according to the second flow rate of urea injection, receive an indication of a NOx level downstream of the SCR catalyst, and adjust the adaptation factor for the present operational region to decrease the NOx level downstream of the SCR catalyst.

Advantages following by means of the present disclosure include the possibility to continuously adapt the operation of the EATS by ensuring that a flow rate of injected urea is kept at an optimal level, thereby ensuring that a minimal level NOx is released into the environment.

The above discussion about the urea injection control system according to the present discourse has been made in relation to an implementation where the EATS comprises only a single SCR catalyst. It should however be understood that the presented urea injection control system may be used also in relation to an implementation comprising more than a single SCR catalyst, such as two SCR catalysts. It should also be understood that some implementations may comprise more than just two NOx sensors, for example when the implementation comprises more than a single SCR catalyst.

It should further be understood that the urea control system 200 according to the present disclosure may be used in relation to any form of EATS configuration comprising an SCR catalyst, further comprising all of the above listed components, or just some of the above listed components. Accordingly, many different EATS variations are possible and within the scope of the present disclosure.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A urea injection control system for an internal combustion engine (ICE), the ICE arranged in relation to an exhaust gas aftertreatment system (EATS), the urea injection control system comprising:
   a urea injector adapted to inject urea into an exhaust line of the ICE, the exhaust line arranged in fluid communication with a selective catalytic reduction catalyst (SCR) of the EATS, and
   a control unit, wherein the control unit is adapted to:
  select a first flow rate of urea injection based on a present operational condition of the ICE,
  determine a present operational region of a plurality of predefined operational regions for the ICE,
  select an adaptation factor for the present operational region,
  form a second flow rate of urea injection based on the first flow rate of urea injection and the selected adaptation factor,
  control the urea injector according to the second flow rate of urea injection,
  receive an indication of a NOx level downstream of the SCR catalyst,
  adjust the adaptation factor for the present operational region to decrease the NOx level downstream of the SCR catalyst,
  receive an indication of a NOx level upstream of the SCR catalyst, and
  adjust the adaptation factor for the present operational region to increase a NOx conversion performance, the NOx conversion performance determined based on the indication of the NOx level upstream of the SCR catalyst and the indication of the NOx level downstream of the SCR catalyst.

2. The urea injection control system according to claim 1, wherein the control unit is further adapted to:
  determine the present operational region based on a combination of at least two intermediate operational parameters for the ICE.

3. The urea injection control system according to claim 2, wherein the at least two intermediate operational parameters for the ICE are an exhaust temperature and an exhaust mass flow through the EATS.

4. The urea injection control system according to claim 2, wherein the at least two intermediate operational parameters for the ICE are selected from a group comprising revolutions per minute for the ICE, a torque value for the ICE, an estimated NOx level generated by the ICE, a urea concentration, an ambient temperature in relation to the ICE, an ambient humidity level in relation to the ICE.

5. The urea injection control system according to claim 1, wherein the control unit is further adapted to:
  receive an indication of a NOx level upstream of the SCR catalyst, and
  determine the present operational condition of the ICE based on the indication of the NOx level upstream of the SCR catalyst.

6. The urea injection control system according to claim 1, wherein the adaptation factor for the present operational region is adapted to maximize the NOx conversion performance.

7. The urea injection control system according to claim 1, wherein the adaptation factor for the present operational region is adapted to minimize the NOx level downstream of the SCR catalyst.

8. The urea injection control system according to claim 1, further comprising:
  a first NOx sensor arranged upstream of the SCR catalyst, and
  a second NOx sensor arranged downstream of the SCR catalyst,
  wherein the first and the second NOx sensor are in communication with the control unit.

9. The urea injection control system according to claim 8, wherein an operational range for first NOx sensor corresponds to an operational range for the second NOx sensor.

10. A vehicle, comprising:
  an internal combustion engine, ICE,
  and an exhaust gas aftertreatment system, EATS, and
  a urea injection control system according to claim 1.

11. A computer implemented method for operating a urea injection control system for an internal combustion engine (ICE), the ICE being arranged in relation to an exhaust gas aftertreatment system (EATS), the urea injection control system comprising:
  a urea injector adapted to inject urea into an exhaust line of the ICE, the exhaust line being arranged in fluid communication with a selective catalytic reduction catalyst (SCR) of the EATS, and
  a control unit,
wherein the method comprises the steps of:
  selecting, using the control unit, a first flow rate of urea injection based on a present operational condition of the ICE,
  determining, using the control unit, a present operational region of a plurality of predefined operational regions for the ICE,
  selecting, using the control unit, an adaptation factor for the present operational region,
  forming, using the control unit, a second flow rate of urea injection based on the first flow rate of urea injection and the selected adaptation factor,
  controlling, using the control unit, the urea injector according to the second flow rate of urea injection,
  receiving, at the control unit, an indication of a NOx level downstream of the SCR catalyst,
  adjusting, using the control unit, the adaptation factor for the present operational region to decrease the NOx level downstream of the SCR catalyst,
  receiving, at the control unit, an indication of a NOx level upstream of the SCR catalyst, and
  adjusting, using the control unit, the adaptation factor for the present operational region to increase a NOx conversion performance, the NOx conversion performance determined based on the indication of the NOx level upstream of the SCR catalyst and the indication of the NOx level downstream of the SCR catalyst.

12. The method according to claim 11, further comprising the step of:
  determining, using the control unit, the present operational region based on a combination of at least two intermediate operational parameters for the ICE.

13. The method according to claim 12, wherein the at least two intermediate operational parameters for the ICE are an exhaust temperature and an exhaust mass flow through the EATS.

14. The method according to claim 11, wherein the at least two intermediate operational parameters for the ICE are selected from a group comprising revolutions per minute for the ICE, a torque value for the ICE, an estimated NOx level generated by the ICE, a urea concentration, an ambient temperature in relation to the ICE, an ambient humidity level in relation to the ICE.

15. The method according to claim 11, further comprising the steps of:
  receiving, at the control unit, an indication of a NOx level upstream of the SCR catalyst, and
  determining, using the control unit, the present operational condition of the ICE based on the indication of the NOx level upstream of the SCR catalyst.

16. A computer program product comprising a non-transitory computer readable medium having stored thereon computer program means for operating a urea injection control system for an internal combustion engine (ICE), the ICE being arranged in relation to an exhaust gas aftertreatment system (EATS), the urea injection control system comprising:
- a urea injector adapted to inject urea into an exhaust line of the ICE, the exhaust line arranged in fluid communication with a selective catalytic reduction (SCR) catalyst of the EATS, and
- a control unit, wherein the computer program product comprises:
- code for selecting, using the control unit, a first flow rate of urea injection based on a present operational condition of the ICE,
- code for determining, using the control unit, a present operational region of a plurality of predefined operational regions for the ICE,
- code for selecting, using the control unit, an adaptation factor for the present operational region,
- code for forming, using the control unit, a second flow rate of urea injection based on the first flow rate of urea injection and the selected adaptation factor,
- code for controlling, using the control unit, the urea injector according to the second flow rate of urea injection,
- code for receiving, at the control unit, an indication of a NOx level downstream of the SCR catalyst,
- code for adjusting, using the control unit, the adaptation factor for the present operational region to decrease the NOx level downstream of the SCR catalyst,
- code for receiving, at the control unit, an indication of a NOx level upstream of the SCR catalyst, and
- code for adjusting, using the control unit, the adaptation factor for the present operational region to increase a NOx conversion performance, the NOx conversion performance determined based on the indication of the NOx level upstream of the SCR catalyst and the indication of the NOx level downstream of the SCR catalyst.

* * * * *